United States Patent
Demarest et al.

(10) Patent No.: US 6,542,274 B1
(45) Date of Patent: Apr. 1, 2003

(54) METHOD AND APPARATUS FOR RECOVERING AN OPTICAL CLOCK SIGNAL

(75) Inventors: Ken Demarest, Lawrence, KS (US); Chris Johnson, Lawrence, KS (US); Chris Allen, Independence, MO (US); Rongqing Hui, Lenexa, KS (US); Benyuan Zhu, Holmdel, NJ (US)

(73) Assignee: Sprint Communications Company, LP, Overland Park, KS (US)

( * ) Notice: Subject to any disclaimer, the term of this patent is extended or adjusted under 35 U.S.C. 154(b) by 0 days.

(21) Appl. No.: 09/430,330

(22) Filed: Oct. 29, 1999

(51) Int. Cl.[7] .............................................. H04B 10/00
(52) U.S. Cl. ........................ 359/158; 359/124; 359/161
(58) Field of Search ................................ 359/158, 124, 359/135, 161; 385/1

(56) References Cited

U.S. PATENT DOCUMENTS 5,911,015 A * 6/1999 Bigo .............................. 385/1
6,081,631 A * 6/2000 Brindel et al. .................. 385/1

OTHER PUBLICATIONS

Ellis, A. D., Smith K., and Patrick, D.M., "All Optical Clock Recovery at Bit Rates Up to 40 Gbit/s," Electronics Letters, vol. 29 (No. 15), p. 1323–1324, (Jul. 22, 1993).

Ludwig, R, Ehrhardt A., Pieper W., Jahn E., Agrawal N., et al., "40 Gbit/s demultiplexing experiment with 10 GHz all–optical clock recovery using a medelocked semiconductor laser," Electronics Letters, vol. 32 (No. 4), p. 327–329, (Feb. 15, 1996).

Barnsley, P.E., Wickes H.J., Wickens G.E., Spirit D. M., "All–Optical Clock Recovery from 5 Gb/s RZ Data Using a Self–Pulsating 1.56 um Laser Diode," IEEE, vol. 3 (No. 10), p. 942–945, (Oct., 1991).

Jinno, Masahiko, Matsumoto, Takao, "Optical Tank Circuits Used for All–Optical Timing Recovery," IEEE, vol. 28 (No. 4), p. 895–900, (Apr., 1992).

Butler, Douglas, et al., "Optical clock recovery from a data stream of an arbitrary bit rate by use of stimulated Brillouin scattering," Optical Society of America, vol. 20 (No. 6), p. 560–562, (Mar. 15, 1995).

* cited by examiner

Primary Examiner—Kinfe-Michael Negash
(74) Attorney, Agent, or Firm—Harley R. Ball; Steven J. Funk; Kevin D. Robb

(57) ABSTRACT

A clock recovery system recovers an optical clock signal from an optical data signal that is wavelength and data rate independent. The system splits the optical data signal into a first optical data signal and a second optical data signal. The system then transmits the first optical data signal and the second optical data signal in opposite directions around a fiber loop. In the fiber loop, the system modulates and amplifies the first optical data signal to generate a modulated-amplified first optical data signal. The system then recovers the optical clock signal after the modulated-amplified first optical data signal and the second optical data signal interact in the fiber loop.

28 Claims, 3 Drawing Sheets

FIG. 1 - PRIOR ART

METHOD AND APPARATUS FOR RECOVERING AN OPTICAL CLOCK SIGNAL

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication systems, and in particular, to a system that recovers an optical clock signal.

2. Description of the Prior Art

Fiber optic communications require synchronization between the transmitter and receiver to derive the optical data. Fiber optic communication systems use an optical clock signal for this synchronization. The transmitter embeds the optical clock signal into an optical data signal. The receiver then extracts the optical clock signal from the optical data signal.

Fiber optic communication systems recover the clock signal from an optical domain, an electrical domain, or a combination of the optical and electrical domain. In the optical domain, the communication system recovers the optical clock signal directly from the optical data signal without any optical to electrical conversions. In the electrical domain, the communication system converts the optical data signal to an electrical data signal using an optical detector. The communication system then produces the electrical clock signal from the electrical data signal. In the combination of the optical and electrical domain, the communication system typically produces the electrical clock signal directly from the optical data signal without converting the optical clock signal to electrical. A solution to recover the optical clock signal in the optical domain with no electronic filtering of the optical clock signal is more transparent and advantageous.

In wavelength division multiplexing (WDM), the transmitter transmits different optical data signals at different wavelengths within the same fiber. Each optical data signal has the ability to carry an optical clock signal in WDM. Also, the data rates may vary between each wavelength in WDM.

Some prior systems recover the clock signal by injecting the optical data signal into a mode-locked fiber ring, a multi-segment mode-locked semiconductor laser, or a self-pulsating laser diode. However, each of these prior systems is data rate dependent and extracts the optical clock signal from only one wavelength.

Another system injects the optical data signal into an optical tank circuit. The optical tank circuit filters the data portion of the optical data signal leaving only the optical clock signal. Most optical tank circuits are data-rate and wavelength dependent. One exception is Brillouin tank circuits.

FIG. 1 depicts a prior solution using a Brillouin tank circuit that recovers an optical clock signal from the optical data signal. A laser transmitter 102 transmits an optical signal to a first modulator 104. The first modulator 104 modulates the optical signal with data into an optical data signal in a return-to-zero format. An Erbium-doped fiber amplifier (EDFA) 106 then amplifies the optical data signal. A coupler 110 receives and splits the optical data signal into a first optical data signal and a second optical data signal. The coupler 110 propagates the first optical data signal clockwise and the second optical data signal counter-clockwise in opposite directions around a fiber loop 150.

The coupler 110 transmits the first optical data signal clockwise to an isolator 120. The isolator 120 isolates the first optical data signal from the second optical data signal to prevent any signals from returning to the coupler 110. A first polarization controller 122 adjusts the polarization of the first optical data signal and transfers the first optical data signal to a second modulator 124. The polarization controllers 122, 126, and 130 align the polarizations of the optical data signals so the first optical data signal and the second optical data signal will interact. The second modulator 124 modulates the first optical data signal at 10.9 GHz. A second polarization controller 126 adjusts the polarization of the first optical data signal and transfers the first optical data signal to a 2 Kilometer polarization maintaining fiber 128.

The coupler 110 propagates the second optical data signal counter-clockwise in the direction of a third polarization controller 130. The third polarization controller 130 adjusts the polarization of the second optical data signal and transfers the second optical data signal to the fiber 128.

In the fiber 128, the first optical data signal and second optical data signal interact in an effect known as stimulated Brillouin scattering. This effect acts as an active filter and amplifies the signals that are above a Brillouin power threshold in the first optical data signal. The amplification occurs through a kinetic energy transfer from the second optical data signal to the fiber 128 and from the fiber 128 to frequency components of the first optical data signal that are above the Brillouin power threshold. The optical clock signal in the first optical data signal is above the Brillouin power threshold. Therefore, the Brillouin scattering effect amplifies the optical clock signal. Thus, the coupler 110 receives the optical clock signal from the fiber 128 and transmits the optical clock signal over an outgoing link 140.

The problem with this Brillouin optical tank system is the system does not operate for WDM signals. There is not enough gain in the EDFA 106 to be effective for WDM signals. There is a need for a system that recovers the optical clock signals from the optical data signals from each wavelength that are at different data rates.

SUMMARY OF THE INVENTION

The invention solves the above problem by recovering an optical clock signal from an optical data signal. A clock recovery system splits the optical data signal into a first optical data signal and a second optical data signal. The clock recovery system then transmits the first optical data signal and the second optical data signal in opposite directions around a fiber loop. In the fiber loop, the clock recovery system modulates and amplifies the first optical data signal to generate a modulated-amplified first optical data signal. The clock recovery system then recovers the optical clock signal after the modulated-amplified first optical data signal and the second optical data signal interact in the fiber loop.

In some embodiments of the invention, the clock recovery system aligns the polarization of the modulated-amplified first optical data signal and the second optical data signal. Also, in one embodiment of the invention, the optical clock signal is above the Brillouin power threshold. In some embodiments of the invention, the optical data signal is an optical WDM data signal.

One advantage of the invention is that the clock recovery system is data rate independent. Thus, the clock recovery system can recover clock signals at different data rates. Another advantage is the clock recovery system is wavelength independent. The clock recovery system recovers clock signals from different wavelengths. Therefore, the invention can recover clock signals from WDM signals, which have different clock signals at different wavelengths with different data rates.

DETAILED DESCRIPTION OF THE INVENTION

Figure 1:
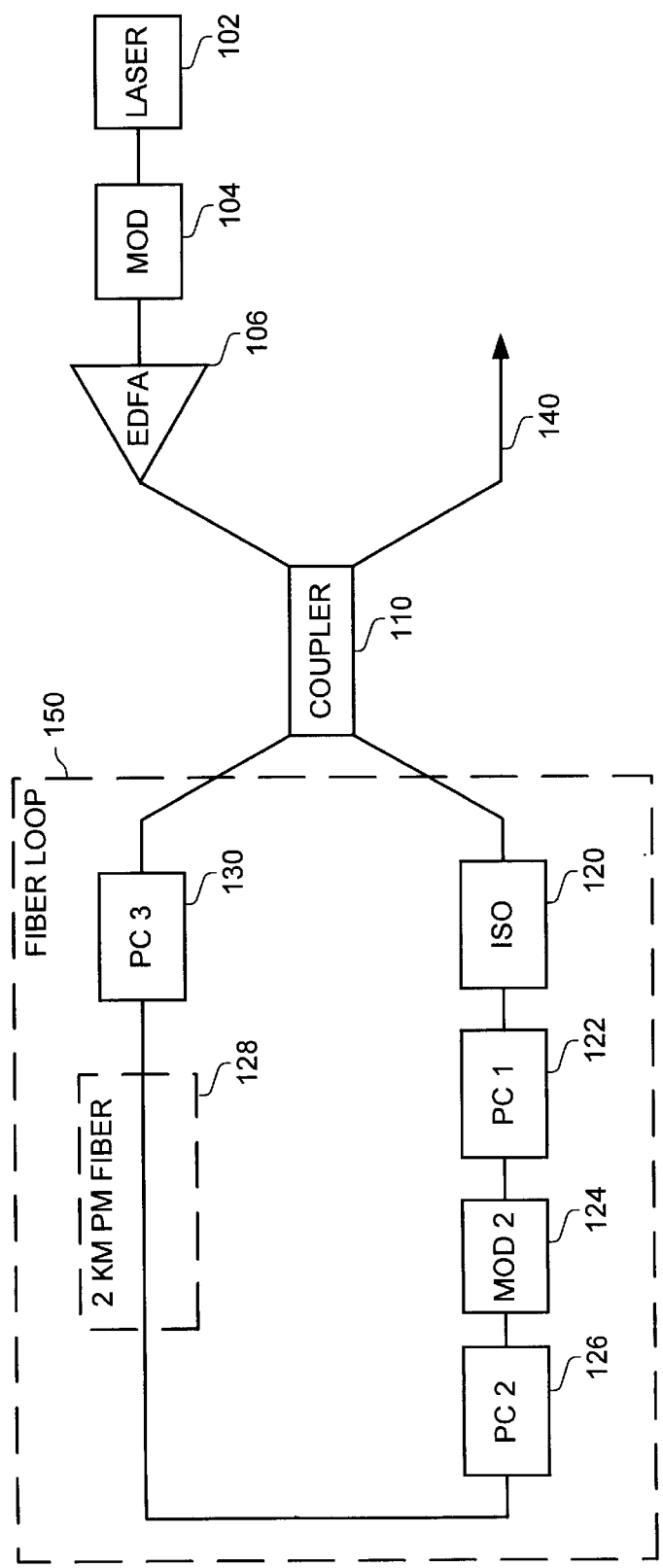
FIG. 1 is a system level block diagram of a prior art solution for recovering an optical clock signal.
Figure 2:
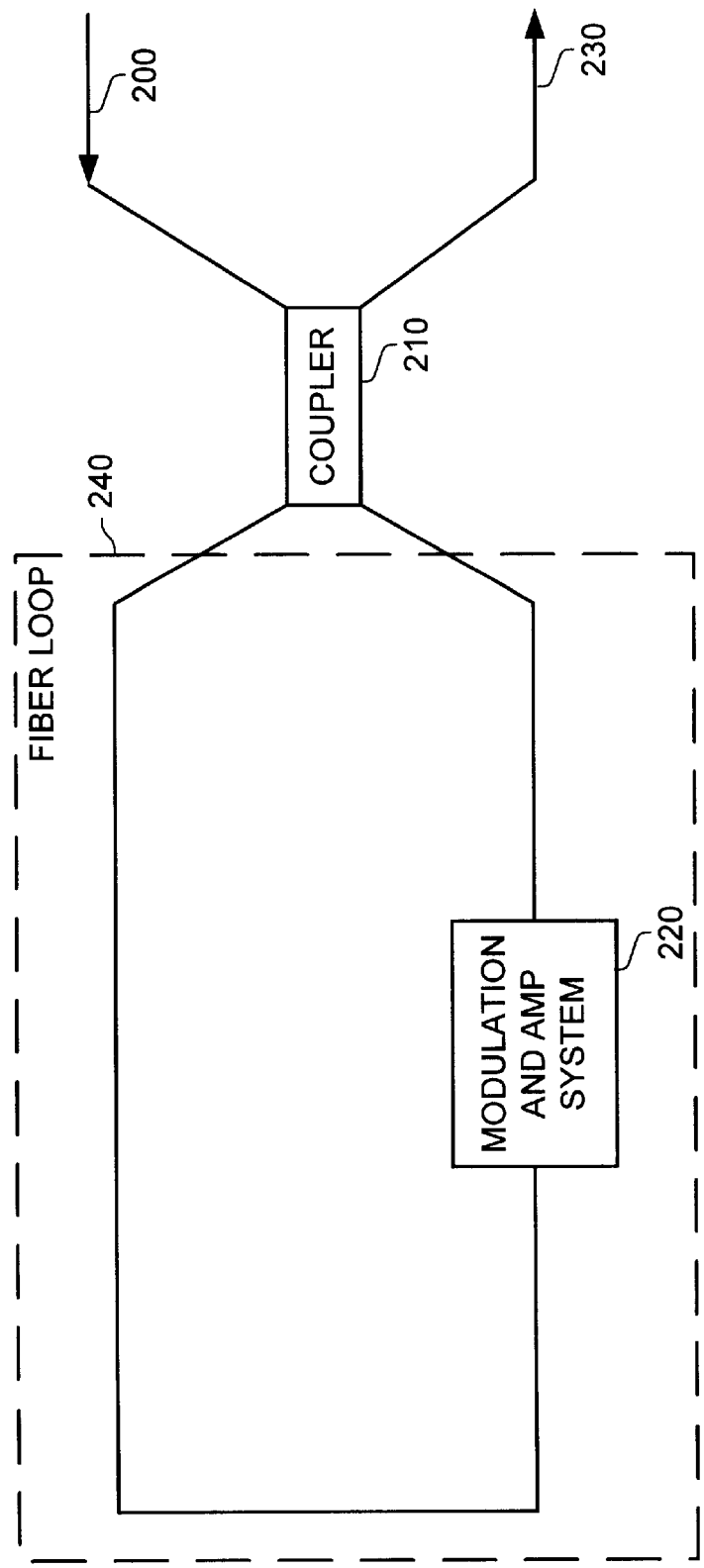
FIG. 2 is a system level block diagram of an example of the invention.

FIG. 2 discloses a system level diagram of an example of the invention. In FIG. 2, a fiber loop 240 includes a modulation and amplification system 220. An incoming link 200 is connected to a coupler 210. The coupler 210 is connected to a modulation and amplification system 220 and an outgoing link 230.

The coupler 210 could be any conventional coupler configured to split the optical data signal into a first optical data signal and a second optical data signal and transmit the first optical data signal and the second optical data signal in opposite directions around a fiber loop. The modulation and amplification system 220 could be any device or group of devices configured to modulate and amplify the first optical data signal to generate a modulated-amplified first optical data signal.

In operation, the coupler 210 receives an optical data signal via the incoming link 200. The coupler 210 splits the optical data signal from the incoming link 200 into a first optical data signal and a second optical data signal. The coupler 210 then transmits the first optical data signal and the second optical data signal in opposite directions around the fiber loop 240. In the fiber loop 240, the modulation and amplification system 220 modulates and amplifies the first optical data signal to generate a modulated-amplified first optical data signal. The modulated-amplified first optical data signal and the second optical data signal interact in the fiber loop 240. The fiber loop 240 then recovers the optical clock signal after the modulated-amplified first optical data signal and the second optical data signal interact in the fiber loop 240. In some embodiments of the invention, the coupler 210 transfers the optical clock signal from the fiber loop 240 to the outgoing link 230.

In some embodiments of the invention, an isolator to prevent the second optical data signal from reentering the coupler 210 may be inserted in the fiber loop 240 to optimize the optical clock signal recovery. In other embodiments, an alignment system that includes a length of fiber and polarization controllers to align the polarizations of the modulated-amplified first optical data signal and the second optical data signal may be added to the fiber loop 240.

Figure 3:
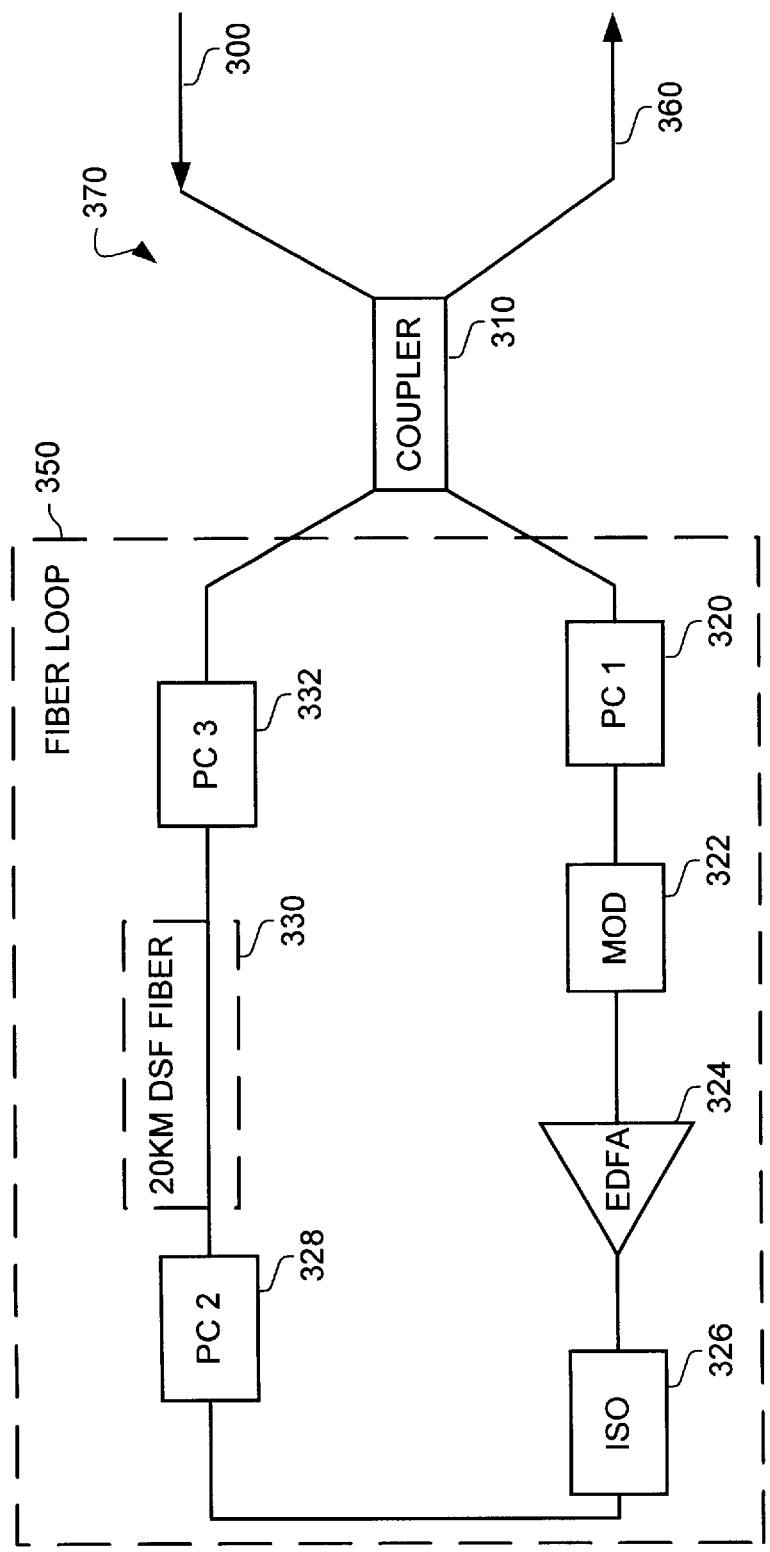
FIG. 3 is a system level diagram of a clock recovery system with a Mach-Zehnder interferometer in an example of the invention.

FIG. 3 discloses one embodiment of the invention, but the invention is not restricted to the configuration provided below. Those skilled in the art will appreciate numerous variations in a clock recovery system configuration and operation that are within the scope of the invention. Those skilled in the art will also appreciate how the principles illustrated in this example can be used in other examples of the invention. A particular reference number in one figure refers to the same element in all of the other figures.

FIG. 3 depicts a system level diagram of a clock recovery system 370 with a Mach-Zehnder interferometer in an example of the invention. In FIG. 3, a fiber loop 350 is comprised of a first polarization controller 320, a Mach-Zehnder interferometer 322, an Erbium-doped fiber amplifier (EDFA) 324, an isolator 326, a second polarization controller 328, a 20 Kilometer (Km) spool of dispersion-shifted fiber (DSF) 330, and a fourth polarization controller 332. An incoming link 300 is connected to a directional coupler 310. The directional coupler 310 is connected to the first polarization controller 320, the third polarization controller 332, and an outgoing link 360. The first polarization controller 320 is connected to the Mach-Zehnder interferometer 322. The Mach-Zehnder interferometer 322 is connected to the EDFA 324. The EDFA 324 is connected to the isolator 326. The isolator 326 is connected to the second polarization controller 328. The second polarization controller 328 is connected to the 20 Km spool of DSF 330. The 20 Km spool of DSF 330 is connected the third polarization controller 332.

In operation, the directional coupler 310 receives an optical WDM data signal via incoming link 300. The optical WDM data signal is in the return-to-zero format. The splitting ratio for the directional coupler is 90:10. The directional coupler 310 then splits the optical WDM data signal into a first optical WDM data signal and a second optical WDM data signal. The directional coupler 310 transmits the first optical WDM data signal clockwise and the second optical WDM data signal counter-clockwise in opposite directions around the fiber loop 350. The first polarization controller 320 then aligns the polarization of the first optical WDM data signal. The polarization controllers 320, 328, and 332 align the polarizations of the optical data signals to optimize the interaction of the first optical data signal and the second optical data signal. The first polarization controller 320 transfers the first optical WDM data signal to the Mach-Zehnder interferometer 322.

The Mach-Zehnder interferometer 322 modulates the first optical WDM data signal. The Mach-Zehnder interferometer 322 acts as a double-sideband, suppressed carrier modulator. In some embodiments of the invention, a 10.5 GHz microwave oscillator drives the electrical ports of the Mach-Zehnder interferometer 322 with opposite polarities. The Mach-Zehnder interferometer 322 also uses an addition of a DC bias signal to the microwave signal. This addition aligns the amplitude of the microwave signal to the output of the Mach-Zehnder interferometer 322. The Mach-Zehnder interferometer 322 downshifts the first optical WDM data signal in frequency by 10.5 GHz with the 10.5 GHz microwave oscillator. For a 10.9 GHz microwave oscillator, there is a 3 nanometer window in which the clock signal can be recovered. In other embodiments of the invention, a plurality of modulators such as the Mach-Zehnder interferometer 322 are put in parallel to increase the window over a larger span of optical wavelengths to recover the optical signal. Each modulator provides the right modulation frequency for a part of the window.

The EDFA 324 then amplifies the modulated first optical WDM data signal. The optimal gain of the EDFA 324 depends on the power levels of the optical WDM data signal, the splitting ratio of the directional coupler 310, and the number of WDM wavelengths present in the optical WDM data signal. The isolator 326 then transfers a modulated-amplified first optical WDM data signal from the EDFA 324 to the second polarization controller 328. The isolator 326 prevents any signal from propagating in the opposite direction of the modulated-amplified first optical WDM data signal.

The second polarization controller 328 aligns the modulated-amplified first optical WDM data signal. The third polarization controller 328 then transfers the modulated-amplified first optical WDM data signal to the 20 Km spool of DSF 330. The third polarization controller 332 aligns the polarization of the second optical WDM data signal. The third polarization controller 332 then transfers the second optical WDM data signal to the 20 Km spool of DSF 330.

In the 20 Km spool of DSF 330, the modulated-amplified first optical WDM data signal interacts with the second optical WDM data signal. This interaction is known as Brillouin scattering. In Brillouin scattering, the interaction amplifies the signals that are above the Brillouin power threshold within each WDM wavelength. In this embodiment of the invention, the optical clock signals are above the Brillouin power threshold. The clock signals above the Brillouin power threshold are amplified due to the Brillouin scattering effect.

The 20 Km spool of DSF 330 then recovers the optical clock signal for each WDM wavelength after the modulated-amplified first optical data signal and the second optical data signal interact in the fiber loop. The third polarization controller 332 transfers the optical clock signals to the directional coupler 310. The directional coupler 310 then transfers the optical clock signals to the outgoing link 360.

Those skilled in the art will appreciate variations of the above-described embodiments that fall within the scope of the invention. As a result, the invention is not limited to the specific examples and illustrations discussed above, but only by the following claims and their equivalents.

We claim:

1. A method of recovering an optical clock signal from an optical signal, the method comprising:

splitting the optical signal into a first optical data signal and a second optical data signal;

transmitting the first optical data signal and the second optical data signal in opposite directions around a fiber loop;

in the fiber loop, modulating and amplifying the first optical data signal to generate a modulated-amplified first optical data signal; and recovering the optical clock signal after the modulated-amplified first optical data signal and the second optical data signal interact in the fiber loop wherein the optical signal, the first optical data signal, and the second optical data signal are wavelength division multiplexed.

2. The method of claim 1 further comprising receiving the optical signal.

3. The method of claim 1 further comprising isolating the first optical data signal from the second optical signal.

4. The method of claim 1 further comprising aligning the polarization of the modulated-amplified first optical data signal and the second optical data signal.

5. The method of claim 1 wherein the optical clock signal is above a Brillouin power threshold in the optical signal.

6. The method of claim 1 wherein amplifying the first optical data signal comprises using a gain based on a power level of the optical signal.

7. The method of claim 1 wherein amplifying the first optical data signal comprises using a gain based on a splitting ratio of a coupler.

8. The method of claim 1 wherein amplifying the first optical data signal comprises using a gain based on a number of wavelengths in the optical signal.

9. The method of claim 1 wherein modulating the first optical data signal comprises downshifting the frequency of the first optical data signal.

10. The method of claim 1 wherein modulating the first optical data signal comprises using a microwave oscillator.

11. The method of claim 1 wherein modulating the first optical data signal comprises applying a DC bias to the first optical data signal.

12. The method of claim 1 wherein the optical signal is in the return-to-zero format.

13. An optical clock recovery system for recovering an optical clock signal from an optical signal, the optical clock recovery system comprising:

a fiber loop configured to recover the optical clock signal after a modulated-amplified first optical data signal and a second optical data signal interact in the fiber loop;

a coupler coupled to the fiber loop and configured to split the optical signal into a first optical data signal and the second optical data signal and transmit the first optical data signal and the second optical data signal in opposite directions around the fiber loop; and a modulation and amplification system coupled to the fiber loop and configured to modulate and amplify the first optical data signal to generate the modulated-amplified first optical data signal wherein the optical signal, the first optical data signal, and the second optical data signal are wavelength division multiplexed.

14. The optical clock recovery system of claim 13 wherein the fiber loop comprises a dispersion shifted fiber.

15. The optical clock recovery system of claim 13 wherein the fiber loop comprises at least one polarization controller configured to align the polarizations of the modulated-amplified first optical data signal and the second optical data signal.

16. The optical clock recovery system of claim 13 further comprising an isolator coupled to the fiber loop and configured to isolate the first optical data signal from the second optical data signal.

17. The optical clock recovery system of claim 13 wherein the modulation and amplification system comprises an amplifier coupled to the fiber loop and configured to amplify the first optical data signal to generate the modulated-amplified first optical data signal.

18. The optical clock recovery system of claim 17 wherein the amplifier is an Erbium-doped fiber amplifier.

19. The optical clock recovery system of claim 13 wherein the coupler is configured to receive the optical data signal.

20. The optical clock recovery system of claim 13 wherein the optical clock signal is above the Brillouin power threshold in the optical signal.

21. The optical clock recovery system of claim 13 wherein a gain of the modulation and amplification system is based on a power level of the optical signal.

22. The optical clock recovery system of claim 13 wherein a gain of the modulation and amplification system is based on a splitting ratio of the coupler.

23. The optical clock recovery system of claim 13 wherein a gain of the modulation and amplification system is based on a number of wavelengths in the optical signal.

24. The optical clock recovery system of claim 13 wherein the modulation and amplification system is configured to downshift the frequency of the first optical data signal.

25. The optical clock recovery system of claim 13 wherein the modulation and amplification system comprises a modulator coupled to the fiber loop and configured to modulate the first optical data signal to generate the modulated-amplified first optical data signal.

26. The optical clock recovery system of claim 25 wherein the modulator comprises a Mach-Zender Interferometer.

27. The optical clock recovery system of claim 13 wherein the modulation and amplification system comprises a plurality of modulators in parallel coupled to the fiber loop and configured to modulate the first optical data signal to generate the modulated-amplified first optical data signal.

28. The optical clock recovery system of claim 13 wherein the optical signal is in the return-to-zero format.

* * * * *